UNITED STATES PATENT OFFICE.

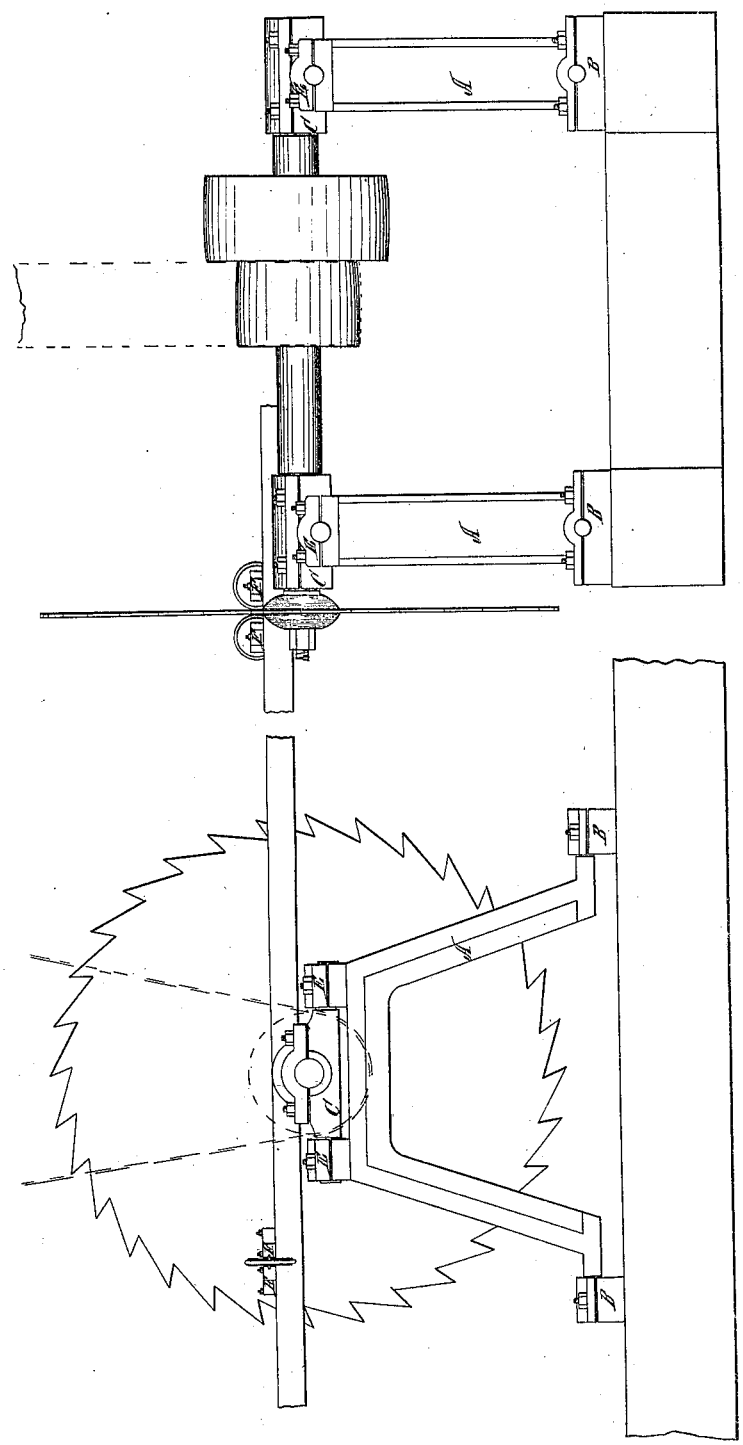

NICH. G. NORCROSS, OF LOWELL, MASSACHUSETTS.

CIRCULAR-SAW MILL.

Specification forming part of Letters Patent No. 7,027, dated January 15, 1850; Reissued July 10, 1860, No. 1,002.

*To all whom it may concern:*

Be it known that I, NICHOLAS G. NORCROSS, of Lowell, in the county of Middlesex and State of Massachusetts, have invented certain new and useful Improvements in Hanging Circular Saws, and that the following is a full, clear, and exact description of the principle or character which distinguishes them from all other things before known and of the usual manner of making, modifying, and using the same, reference being had to the accompanying drawing, which forms a part thereof.

The nature of my invention consists in suspending the saw so that it can have a lateral vibration; and when thrown out of line, will recover itself by the action of the driving belt, and the arrangement of the parts by which it is sustained, while at the same time the arbor has no lateral play in its boxes, and is made to fit close with shoulders, to prevent the oil from getting out while in operation, a matter of great importance when the motion is rapid as in circular saws: this is effected by supporting the boxes in which the journals of the arbor run, upon standards to which said boxes are jointed, and which are themselves jointed to the foundation to which they are attached, so that the arbor is kept horizontal, while it is allowed a sufficient lateral play, the motion being in a curved line, and of course inclining downward, as the tops of the standards recede either way from a vertical position: to sustain this frame upright, the driving belt that passes around the pulley on the arbor, up over a driving pulley above, and thus holds the frame up to the proper point, so that the saw is actually suspended by the belt, while it is kept steady, and made to run properly by the frame below; by this arrangement it will be seen, that while the slightest force will cause the arbor to deviate a little laterally, the constant tendency of the reacting agent is to bring it back to place again: by this means I am enabled to use a much thinner saw, and save material and power to a great degree.

To enable others skilled in the art to make and use my invention, I will proceed to describe its construction and operation.

I construct my circular saw-frames in any of the known forms, and apply thereto shafts, screws, pulleys, and other appendages of circular saw-frames; but in order to obviate the danger of the heating and warping of the saw, and to prevent the frequent departure from its course, arising from the saw's contact with knots, and otherwise; and in order to make a saving in any given amount of power, and to enable any one to use the circular saw for sawing boards, logs, and heavy timber; I make the feet, of the standard in the boxes, as shown at (B) in the accompanying drawing, stand on gudgeons, or pivots, to give the frame a lateral motion to any desired extent. The saw shaft passes through rocker boxes (C); and I hang said boxes on pivots or gudgeons in boxes (E), all of which so apply themselves to the motion of the frame as to prevent the binding of the bearings in the boxes. I also fix screws or guides at boxes (F and E) upon each side of the frame, to regulate the motion: these screws or guides may however be fixed elsewhere upon the frame, and secure the same desired results. The four legs of the standard stand in the boxes upon gudgeons, as aforesaid, on one side of the circular saw; and when in operation the saw moves freely, and without hindrance from knots, heat, warp, and without any other of the causes which have hitherto operated to prevent its successful working in large logs and timber. The driving power is connected from above by a belt.

What I claim as my invention, and desire to secure by Letters Patent, is—

The application to circular saw frames, of rocker boxes and a swing frame as herein set forth, and suspending said frame in position, by means of the driving belt, as above described, for the free and succesful operation of the saw, by the motion before mentioned.

N. G. NORCROSS.

Witnesses:
MELZAR F. HOBBS,
F. R. GOULD.

[FIRST PRINTED 1913.]